US011041782B2

(12) United States Patent
Cheng et al.

(10) Patent No.: US 11,041,782 B2
(45) Date of Patent: Jun. 22, 2021

(54) SECURE SYSTEMS AND METHODS FOR MACHINE MONITORING

(71) Applicant: General Electric Company, Schenectady, NY (US)

(72) Inventors: Chien Chung Cheng, Carson City, NV (US); Michael Alan Tart, Gardnerville, NV (US); Scott Terrell Williams, Minden, NV (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 749 days.

(21) Appl. No.: 13/937,989

(22) Filed: Jul. 9, 2013

(65) Prior Publication Data
US 2015/0019169 A1    Jan. 15, 2015

(51) Int. Cl.
| | |
|---|---|
| *G01M 15/02* | (2006.01) |
| *G06F 8/71* | (2018.01) |
| *H04L 29/06* | (2006.01) |
| *G06F 21/82* | (2013.01) |
| *G05B 9/02* | (2006.01) |
| *G06F 21/55* | (2013.01) |

(52) U.S. Cl.
CPC .............. *G01M 15/02* (2013.01); *G05B 9/02* (2013.01); *G06F 8/71* (2013.01); *G06F 21/55* (2013.01); *G06F 21/82* (2013.01); *H04L 63/0209* (2013.01)

(58) Field of Classification Search
CPC .......... G01M 15/02; G05B 9/02; G06F 21/55; G06F 21/82; H04L 63/0209
See application file for complete search history.

(56) References Cited

U.S. PATENT DOCUMENTS

| | | | | |
|---|---|---|---|---|
| 8,756,436 B2* | 6/2014 | Frenkel | ............... | H04L 63/0485 713/193 |
| 8,839,663 B2* | 9/2014 | Maddaus | ................ | F01D 17/08 73/112.01 |
| 9,762,536 B2* | 9/2017 | Frenkel | .................... | G06F 21/30 |
| 2002/0194578 A1* | 12/2002 | Irie | ........................... | G06F 8/36 717/122 |

(Continued)

FOREIGN PATENT DOCUMENTS

WO      2009004611 A2     1/2009

OTHER PUBLICATIONS

Supreme Court, *Alice Corp v CLS Bank Int'l*, 110 USPQ 2d 1976 (2014).*

(Continued)

*Primary Examiner* — Catherine T. Rastovski
*Assistant Examiner* — Liam R Casey
(74) *Attorney, Agent, or Firm* — Mintz Levin Cohn Ferris Glovsky and Popeo, PC; Lisa Adams

(57) ABSTRACT

A system includes a secure data interface system. The secure data interface system includes a one-way communications interface configured to communicatively couple to a monitoring and protection system to receive data transmitted by the monitoring and protection system, and a processor configured to derive at least one measurement based on the data. The secure data interface system further includes a two-way communications interface configured to communicate the measurement to an external system, wherein the monitoring and protection system is configured to monitor operations of a machinery.

19 Claims, 6 Drawing Sheets

(56) References Cited

U.S. PATENT DOCUMENTS

| | | | | |
|---|---|---|---|---|
| 2005/0144437 A1* | 6/2005 | Ransom | ............... | G06F 1/28 |
| | | | | 713/151 |
| 2005/0151659 A1* | 7/2005 | Donovan | ............ | H02G 7/00 |
| | | | | 340/664 |
| 2009/0002150 A1* | 1/2009 | Zilberstein | ...... | G05B 23/0208 |
| | | | | 340/531 |
| 2009/0093892 A1 | 4/2009 | Kant et al. | | |
| 2009/0106732 A1* | 4/2009 | Hanson | ......... | G06F 17/30398 |
| | | | | 717/104 |
| 2010/0148940 A1* | 6/2010 | Gelvin | ............... | H04L 67/12 |
| | | | | 340/286.02 |
| 2013/0030765 A1* | 1/2013 | David | ............. | G05B 23/024 |
| | | | | 702/183 |
| 2013/0297928 A1* | 11/2013 | Wyss | ............... | G05B 19/042 |
| | | | | 713/100 |
| 2014/0039699 A1* | 2/2014 | Forbes, Jr. | ......... | G05B 19/02 |
| | | | | 700/286 |
| 2015/0179041 A1* | 6/2015 | Blaufuss | ............. | G07C 9/38 |
| | | | | 340/686.6 |

OTHER PUBLICATIONS

Hajsadr et al., "Turbogenerator Computer Aided Control System Design Tool", IEEE Transactions on Energy conversion, vol. No. 8, Issue No. 4, pp. 714-718, Dec. 1, 1993.

Milne et al., "TIGER: Real-Time Situation Assessment of Dynamic Systems", Intelligent systems Engineering, vol. No. 3, Issue No. 3, pp. 103-124, Sep. 21, 1994.

European Search Report issued in connection with corresponding EP Application No. 14175775.7 dated Feb. 20, 2015.

\* cited by examiner

SECURE SYSTEMS AND METHODS FOR MACHINE MONITORING

BACKGROUND OF THE INVENTION

The subject matter disclosed herein relates to systems and methods for providing secure monitoring of machinery, including turbomachinery.

Certain mechanical systems, including rotating machinery such as turbines, are useful in propulsion and power generation systems. These systems may include monitoring and protection systems. Accordingly, the mechanical systems may be communicatively coupled to the monitoring and protection system for condition monitoring. The monitoring and protection system may monitor various operating parameters of the mechanical systems, and may then actuate protective devices based on the monitored parameters. Accordingly, the monitored mechanical systems may operate with enhanced protection. It would be beneficial to improve security of the monitoring systems.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a secure data interface system. The secure data interface system includes a one-way communications interface configured to communicatively couple to a monitoring and protection system to receive data transmitted by the monitoring and protection system, and a processor configured to derive at least one measurement based on the data. The secure data interface system further includes a two-way communications interface configured to communicate the measurement to an external system, wherein the monitoring and protection system is configured to monitor operations of a machinery.

In a second embodiment, a system includes a monitoring and protection system. The monitoring and protection system includes a first processor and a rack. The monitoring and protection system further includes a secure data interface card configured to be mounted on the rack and coupled to the communications backplane. The secure data interface card includes a one-way communications interface configured to communicatively couple to the first processor to receive a data via the communications backplane, and a second processor configured to derive at least one measurement based on the data. The secure data interface card further includes a two-way communications interface configured to communicate the measurement to an external system, wherein the monitoring and protection system is configured to monitor operations of a machinery.

In a third embodiment, a method includes monitoring operations of a machinery by using a monitoring and protection system. The method further includes using the monitoring and protection system to only transmit a first data via a one-way data flow and using a secure data interface system to receive the first data via the one-way data flow. The method additionally includes processing the first data to derive a machinery measurement by emulating the monitoring and protection system if the first data comprises a raw sensor data, and transmitting the measurement to an external system via a two-way data flow.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
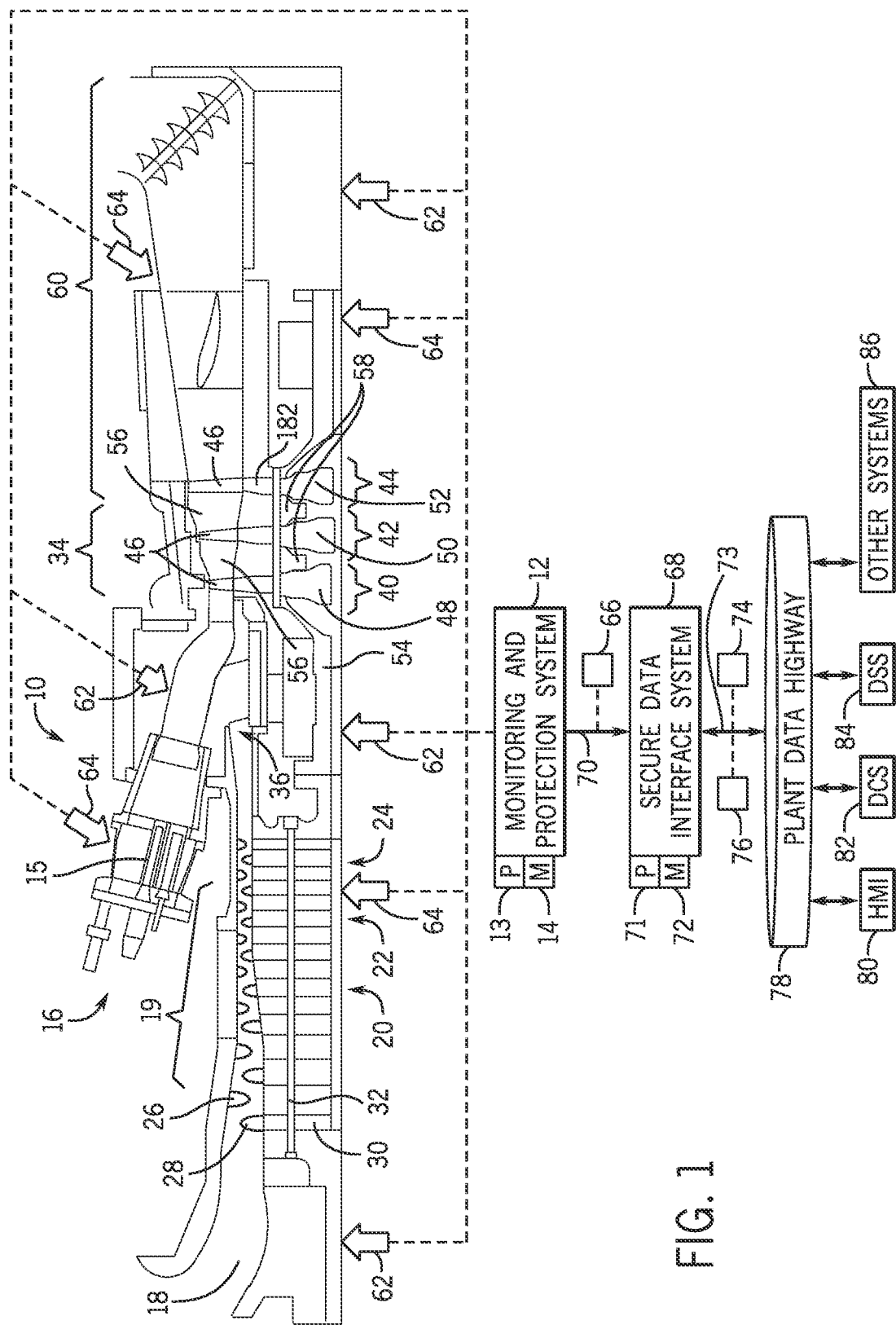
FIG. 1 is a schematic diagram of an embodiment of a monitoring and protection system monitoring a machinery.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In certain embodiments described herein, a secure machine monitoring and protection system is provided with improved security features. The secure machine monitoring and protection system may include a secure data interface that minimizes or eliminates the possibility of tampering, such as network tampering or "hacking," of the secure machine monitoring and protection system and of monitored machinery. The secure data interface may be used to mediate communications between the monitoring and protection system and external systems, such as a decision support system (DSS), a human machine interface (HMI), a distributed control system (DCS), and any other system that would be communicatively coupled to the secure machine monitoring and protection system, for example through a network such as a local area network (LAN) or a wide area network (WAN).

In one embodiment, the secure data interface may provide for a one-way communications interface used to receive data from the monitoring and protection system. The secure data interface may further process the received data by applying substantially the same data processing that may be applied by the monitoring and protection device. Accordingly, a first output derived by the monitoring and protection device may be substantially similar to a second output derived by the secure data interface. The secure data interface, rather than the monitoring and protection device, may then communicate the second output to the external systems. Likewise, communicative interactions or queries initiated by the external systems may be responded by the secure data interface, instead of by the monitoring and protection device. In this manner, substantially all data from the monitoring and protection device flows in a single direction (e.g., to the secure data interface).

By enabling a one-directional flow of data and by providing for substantially similar processing as the monitoring and protection device (e.g., emulation of the monitoring and protection device), the secure data interface minimizes tampering of the monitoring and protection device, and of systems communicatively coupled to the monitoring and protection device. In this embodiment, external systems communicate with the secure data interface rather than with the monitoring and protection device. The secure data interface provides for substantially the same data processing as those provided by the monitoring and protection device, and communicates data processing results to the external systems. Additionally, changes, such as parameter changes, programming changes, variable changes, firmware changes, and so on, applied to the monitoring and protection system, may be synchronized automatically or manually and applied to the secure data interface, thus maintaining the same functionality in both systems. By separating the monitoring and protection device and the monitored machinery from interacting with external systems, the techniques described herein may provide for increased security, reliability, and protection from tampering.

It may be beneficial to first discuss embodiments of certain machinery that may be used with the disclosed embodiments. With the foregoing in mind and turning now to FIG. 1, an embodiment of a turbine system 10 is illustrated. Certain machinery, such as the turbine system 10, may include various components as further described below, that may be monitored during operations. For example, a monitoring and protection system 12 may be communicatively coupled to the turbine system 10 and used to monitor a variety of parameters, as described in more detail below. The monitoring and protection system 12 may include a processor 13 useful in executing computer instructions and a memory 14 useful in storing data and computer instructions.

During operation of the turbine system 10, a fuel such as natural gas or syngas, may be routed to the turbine system 10 through one or more fuel nozzles 15 into a combustor 16. Air may enter the turbine system 10 through an air intake section 18 and may be compressed by a compressor 19. The compressor 19 may include a series of stages 20, 22, and 24 that compress the air. Stage 20 may be a low pressure stage, stage 22 may be an intermediate pressure stage, and stage 24 may be a high pressure stage. Each stage includes one or more sets of stationary vanes 26. Each stage includes blades 28 that rotate to progressively increase the pressure to provide compressed air. The blades 28 are attached to rotating wheels 30 connected to a shaft 32.

The compressed discharge air from the compressor 19 exits the compressor 19 through a diffuser section 36 and is directed into the combustor 16 to mix with the fuel. For example, the fuel nozzles 15 injects fuel into compressed air in the combustor 16 in a suitable ratio for optimal combustion, resulting in minimal emissions, minimal fuel consumption, and maximum power output. In certain embodiments, the turbine system 10 may include multiple combustors 16 disposed in an annular arrangement. Each combustor 16 may direct hot combustion gases into a turbine 34.

In the depicted embodiment, the turbine system 10 includes a turbine section 34 having three separate stages 40, 42, and 44. The stage 40 is a high pressure stage, stage 42 is an intermediate pressure stage, and stage 44 is a low pressure stage. Each stage 40, 42, and 44 includes a set of blades or buckets 46 coupled to a respective rotor wheel 48, 50, and 52, which are attached to a shaft 54. As the hot combustion gases cause rotation of turbine blades 46, the shaft 54 rotates to drive the compressor 19 and any other suitable load, such as an electrical generator. Eventually, the turbine system 10 diffuses and exhausts the combustion gases through an exhaust section 60.

The turbine system may also include a plurality of sensors 62 configured to monitor a plurality of engine parameters related to the operation and performance of the gas turbine engine 10. The sensors may include, for example, inlet sensors and outlet sensors positioned adjacent to, for example, the inlet and outlet portions of the turbine 16, sensors 62 positioned to sense the various stages (e.g., 20, 22, and/or 24) of the compressor 19. The inlet sensors and outlet sensors 62 may measure, for example, environmental conditions, such as ambient temperature and ambient pressure. The sensors 62 may also measure a plurality of engine parameters related to the operation and performance of the turbine system 10, such as, exhaust gas temperature, rotor speed, engine temperature, engine pressure, gas temperature, engine fuel flow, exhaust flow, vibration, clearance between rotating and stationary components, compressor discharge pressure, gas composition such as pollution (e.g., carbon monoxide, nitrogen oxides, carbon dioxide, particulate count), and turbine exhaust pressure. Further, the sensors 62 may also measure actuator 64 information such as valve position, and a geometry position of variable geometry components (e.g., inlet guide vanes at an air inlet). Accordingly, the actuators 64 may be used to control fuel flow, guide vanes, position certain components, and the like, and may include valves, positioners, pumps, electrical relays, and so on.

As such, the sensors 62 may include, but are not limited to, thermocouples, proximity sensors, eddy current sensors, ultrasonic sensors, velocity sensors, vibration sensors, pressure sensors, clearance sensors, accelerometers, gyroscopes, chemical sensors, optical sensors, and the like. The plurality of sensors 62 may also be configured to monitor engine parameters related to various operational phases (e.g., start-up, steady state, transient state, and shut down) of the turbine system 10. Measurements taken by the plurality of sensors 62 may be transmitted as electrical signals to the monitoring and protection system 12. The monitoring and protection system 12 may then process the sensor signals and derive a set of calculations useful in determining the condition of the turbine system 10.

For example, the monitoring and protection system 12 may derive keyphasor measurements (e.g., phase relationship between vibration components and timing marks on the shaft 32 and/or 54), relative vibration (e.g., using proximity probes), axial positions, radial positions, casing velocity, casing acceleration, temperatures, differential expansion/case expansion, overspeed detection, rotor wheel 48, 50, 52 acceleration, actuator positions (e.g., valve positions, linear actuator positions), shaft 32 and/or 54 eccentricity, rolling element bearing activity monitor (REBAM®) data, vibration measurements (e.g., axial vibration, radial vibration), speed measurements, clearance measurements (e.g., distance between a rotating component and a stationary component), pressure measurements, flow measurements, or a combination thereof. Accordingly, operating conditions may be derived, including normal operations, abnormal operations, and so on.

The measurements derived by using the sensor 62 signals may also be used by the monitoring and protection system 12 to derive alerts and/or alarms. For example, ranges for the derived measurements may be set, and derived measurements outside of the ranges may trigger the alerts and/or alarms. The alerts and alarms may result in the operation of actuators 64, such as valves, positioners, pumps, electrical relays, and so on, suitable for responding to the alerts and/or alarms.

In the depicted embodiment, data 66, including raw sensor 62 data, is provided to a secure data interface system 68 by using a one way communication data flow 70. The one-way data flow 70 may use a communications conduit such as a backplane communications bus, a fiber optic cable, an electrically-conductive cable, and the like. The data 66 may include substantially all of the signals produced by the sensors 62, e.g., raw data. That is, the data 66 may include sensor 62 signals indicative of system 10 conditions. In one embodiment, the secure data interface system 68 may then use raw data 66 to derive the same measurements, conditions, parameters, alarms, alerts, and so on, as those derived by the monitoring and protection system 12. These system 68 derivations may include, but are not limited to keyphasor measurements (e.g., phase relationship between vibration components and timing marks on the shaft 32 and/or 54), relative vibration (e.g., using proximity probes), axial positions, radial positions, casing velocity, casing acceleration, temperatures, differential expansion/case expansion, overspeed detection, rotor wheel 48, 50, 52 acceleration, actuator positions (e.g., valve positions, linear actuator positions), shaft 32 and/or 54 eccentricity, rolling element bearing activity monitor (REBAM®) data, vibration measurements (e.g., axial vibration, radial vibration), speed measurements, clearance measurements (e.g., distance between a rotating component and a stationary component), pressure measurements, flow measurements, or a combination thereof.

In another embodiment, the data 66 may include some or substantially all of the derived measurements provided by the monitoring and protection system 12, such the keyphasor measurements, relative vibration, axial positions, radial positions, casing velocity, casing acceleration, temperatures, differential expansion/case expansion, overspeed detection, rotor wheel 48, 50, 52 acceleration, actuator positions (e.g., valve positions, linear actuator positions), shaft 32 and/or 54 eccentricity, rolling element bearing activity monitor (REBAM®) data, vibration measurements (e.g., axial vibration, radial vibration), speed measurements, clearance measurements (e.g., distance between a rotating component and a stationary component), pressure measurements, flow measurements, or a combination thereof. The secure data interface 68 may include a processor 71 suitable for executing computer instructions and a memory 72 useful in storing data and computer instructions.

The secure data interface 68 may then communicate with external systems using a two-way data flow 73. That is, a data 74 may be transmitted from the secure data interface system 68, and a data 76 may be received by the secure data interface system 68, for example, by using a plant data highway 78. The plant data highway 78 may include a communications network more optimized for use in an industrial environment. In this manner, a human machine interface (HMI) 80, a distributed control system (DCS) 82, a decision support system (DSS) 84, and/or other systems 86 may communicate with the secure data interface system 68 and use the data 74, which may include measurements derived from the sensors 62, for further analysis. Likewise, the systems 80, 82, 84, and/or 86 may communicate the data 68, for example, to request specific derived measurements through the data 68, of system 10 parameters, and so on.

Should undesirable control of the systems 80, 82, 84, 86, and/or the plant data highway 78 be obtained by an unwanted entity (e.g., hacker), the secure data interface 68 may provide a second level of protection, for example, by incorporating intrusion detection techniques. Such techniques may include statistical analysis of communications, virus checking, malware detection, and so on. In another embodiment, no intrusion detection may be used. However, in both embodiments, even if the secure data interface system 68 is compromised, a first level of protection is provided by virtue of using only the one-way data flow 70. More specifically, because data 66 is flowing one-way only, the monitoring and protection system 12 and the turbine system 10 remains unaffected by the attempted attack and/or intrusion. Additionally, physical tampering protection, such as tampering sensors, physical key access, and the like, may be used to secure the systems 10, 12, and 68. By providing for one or more levels of protection, including one way data flows, the techniques described herein may enable more secure, reliable, and tamper-proof equipment monitoring and protection. It is to be understood that the techniques described herein may be useful in other monitored machinery and turbomachinery, including but not limited to steam turbines, hydro turbines, wind turbines, compressors (air/process gas, radial/axial, centrifugal/positive displacement), turbo expanders, electric motors, electric generators, electrical exciters, gear boxes, pumps (e.g., centrifugal, positive displacement), fans, blowers, extruders, pelletizers, furnaces, boilers, gasifier, gas treatment units, and the like.

Figure 2:
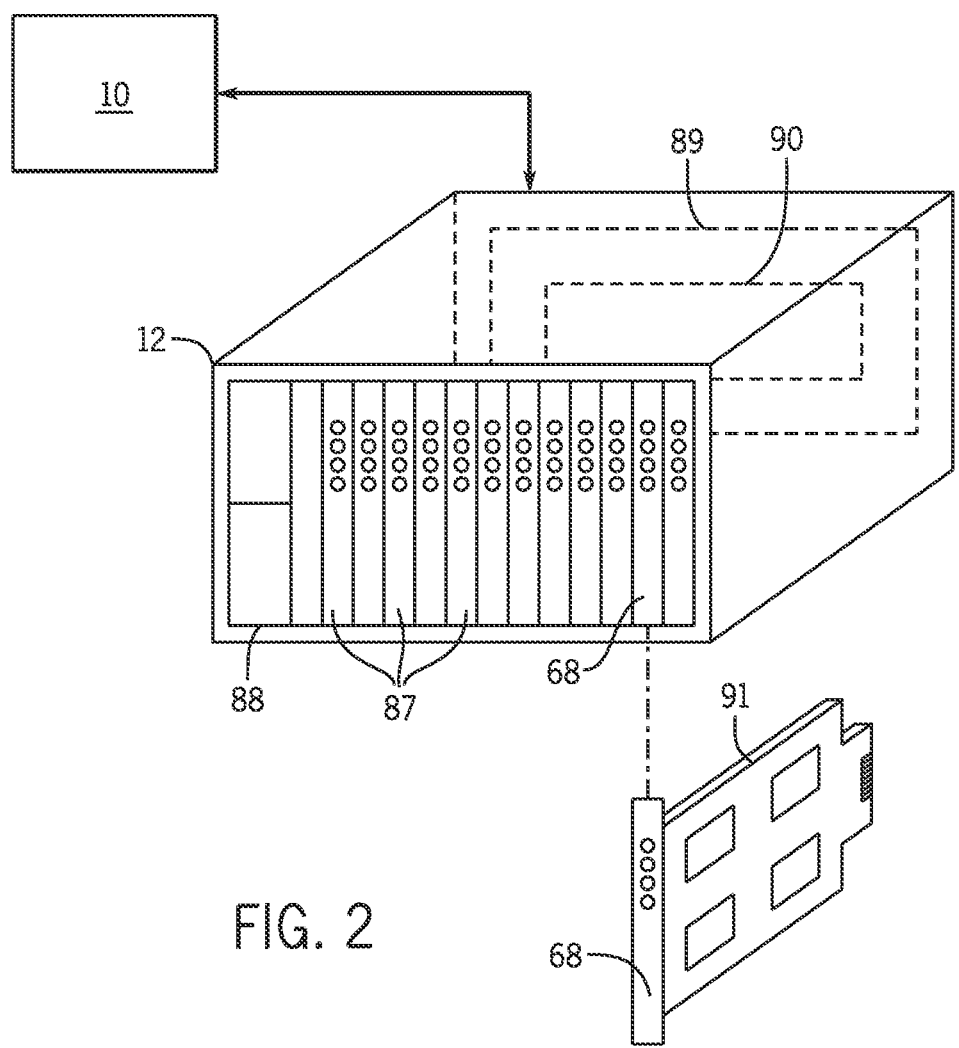
FIG. 2 is a perspective view of an embodiment of the monitoring and protection system of FIG. 1 including a secure data interface system.

FIG. 2 is a perspective view of an embodiment of the monitoring and protection system 12, which includes a series of rack mountable devices 87 mounted in a cabinet 88. Rack mountable devices 87 may include, for example: rack mountable cards that provide for data processing, memory, power supplies, vibration and position monitoring, keyphasor monitoring, aero-derivative turbine system condition monitoring, hydro-turbine condition monitoring, wind turbine condition monitoring, reciprocating compressor monitoring, temperature monitoring, pressure monitoring, process variable monitoring, clearance (e.g., distance between rotating and stationary components) monitoring, flow monitoring, actuating relays, pumps, valves, and the like. The devices 87 may be communicatively coupled by using a rack backplane 89. For example, the backplane 89 may include a data communications bus 90 suitable for handling communications between the various cards 87.

Also depicted is the secure data interface system 68 provided as a rack mountable card 91, which may include hot swappable capabilities. That is, the secure data interface system 68 may be replaced with a second secure data interface system 68 without turning off the monitoring and protection system 12. Indeed, should the secure data interface system 68 experience undesired conditions, the secure data interface system 68 may be removed and replaced with a second secure data interface 68 without having to turn off the monitoring and protection system 12 and/or the monitored system 10. As described above, the secured data interface system 68 includes the one way data flow 70, which communicates through the bus 90. During monitoring and protection operations, data incoming from the monitored system 10 may be processed by one or more of the cards 87 and by the secure data interface system 68 to derive a set of measurements, conditions, parameters, alarms, alerts, and so on, useful in providing for the condition of the monitored system 10. The secured data interface system 68 may emulate all or substantially all of the processing provided by the monitoring and protection system 12, including one or all of the rack mountable cards 87, and communicate such derivations to external systems 80, 82, 84, and/or 86, as described in more detail below with respect to FIG. 3. By providing for emulated one-way data, the secure data interface system 68 may substantially improve the security of the monitoring and protection system 12.

Figure 3:
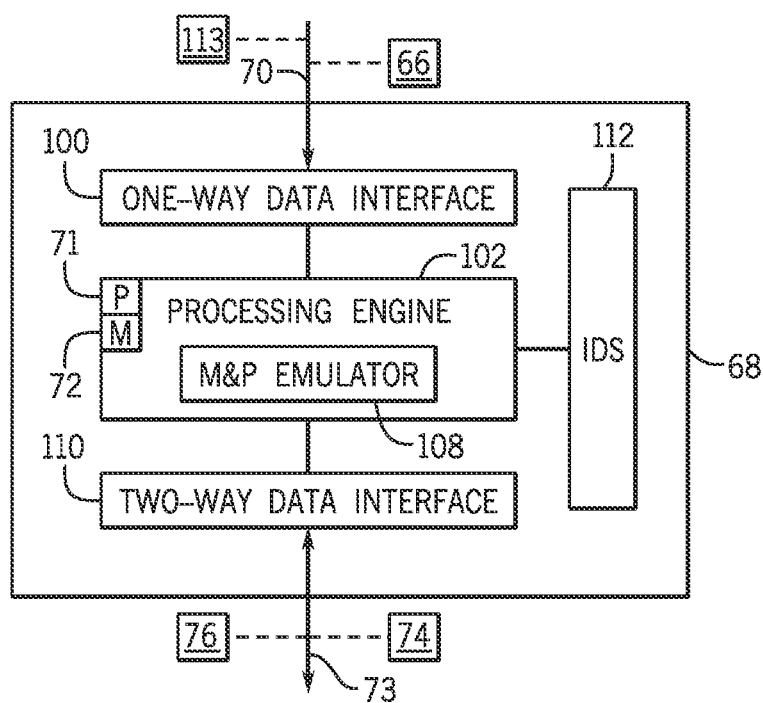
FIG. 3 is a block diagram of and embodiment of the secure data interface system of FIGS. 1 and 2.

FIG. 3 is a block diagram of an embodiment of the secure data interface 68. As mentioned earlier, the secure data interface system 68 may be provided as a hot swappable card 91 (shown in FIG. 2), which may be mounted into a rack of the monitoring and protection system 12. In the depicted embodiment, the one way data flow 70 is shown as communicatively coupled to a one way data interface 100. The data 66 is transmitted from the monitoring and protection system 12 and received by the one-way data interface 100, for example, by using the communications bus 90. The one-way data interface 100 may be provided as a circuitry included in the hot swappable card 91 suitable for receiving data only and not for transmitting data. Accordingly, the one-way data interface 100 may provide protection by restricting data from flowing into the monitoring and protection system 12 and the monitored system 10. Because the monitoring and protection system 12 and the monitored system 10 may be sending data only, any undesired party (e.g., hacker) may be substantially blocked from tampering with the systems 10 and 12.

As further illustrated in FIG. 3, a processing engine 102 is communicatively coupled to the one-way data interface 100. The processing engine 102 may be provided as circuitry included in the card 91 and may include one or more processors 71 and the memory 72. The processor 71 executes computer instructions, such as computer instructions stored in the memory 72. In one example, the processing engine 102 may execute computer instructions providing for a monitoring and protection system emulator 108. The emulator 108 may include all or substantially all of the algorithms used by the monitoring and protection system 12 and/or cards 87 to process raw sensor 62 data and to transform the data, such as data 66, into the derived measurements and conditions of the monitored system 10.

A two-way data interface 110 is also included, suitable for communicating with external systems such as the HMI 80, the DCS 82, the DSS 84, and/or other systems 86. The two-way data interface 110 may be provided as circuitry included in the rack mountable card 91 shown in FIG. 2. Accordingly, the data 74 and/or 76 may be communicated by using the two-way data interface 110 through the two-way data flow 73, as depicted. The systems 80, 82, 84, and/or 86 may use the two-way data interface 110 to query for additional derivations, measurements, and so on, suitable for further analysis of the monitored system 10.

The secure data interface system 68 may additionally include an intrusion detection system (IDS) 112 suitable for detecting tampering of the secure data interface system 68. For example, the IDS 112 may include virus checkers, malware detection techniques, statistical analysis techniques, artificial intelligence techniques, and so on, to detect an unwanted entity attempting to use or take over the secure data interface 68. Should the IDS 112 detect unwanted behavior, the IDS 112 may then issue alerts, alarms, turn on lights, and/or perform ones actions/algorithms included in the secure digital system 68, such as lights included in the card 91 to further notify operators of the unwanted intrusion. The IDS 112 may also notify the systems 80, 82, 84, and/or 86 by transmitting data 76, including type of intrusion (e.g., virus, Trojan, denial of service attack), time of intrusion, and so on.

The M&P emulator 108 may process the data 66, including raw sensor 62 data, and derive keyphasor measurements (e.g., phase relationship between vibration components and timing marks on the shaft 32 and/or 54), relative vibration (e.g., using proximity probes), axial positions, radial positions, casing velocity, casing acceleration, temperatures, differential expansion/case expansion, overspeed detection, rotor wheel 48, 50, 52 acceleration, actuator positions (e.g., valve positions, linear actuator positions), shaft 32 and/or 54 eccentricity, rolling element bearing activity monitor (RE-BAM®) data, vibration measurements (e.g., axial vibration, radial vibration), speed measurements, clearance measurements (e.g., distance between a rotating component and a stationary component), pressure measurements, flow measurements, or a combination thereof. Accordingly, operating conditions for the system 10 may be derived by the M&P emulator 108, including normal operations, abnormal operations, and so on.

The measurements derived by the M&P emulator 108 may also be used to derive alerts and/or alarms. For example, ranges for the derived measurements may be set, and derived measurements outside of the ranges may trigger the alerts and/or alarms. All of the derivations computed by the M&P emulator 108 may then be communicated to the systems 80, 82, 84, and/or 86 by using the two-way data interface 110. The systems 80, 82, 84, and/or 86 may request further derivations by transmitting data 76 through the two-way data interface 110, and the M&P emulator 108 may respond with further data 74. By providing for techniques such as the one-way data interface 100 and the IDS 112, the secure data interface 68 may provide substantial protection against unwanted intrusion of the monitoring and protection system 12 and the monitored system 10, thus enhancing safety and increasing reliability of operations.

Because the M&P emulator 108 may substantially emulate the monitoring and protection system 12, the external systems 80, 82, 84, and/or 86 may communicate only with the secure data interface system 68, thus eliminating transmission of data directed to the monitoring and protection system 12. Indeed, in certain embodiments, the external systems 80, 82, 84, and/or 86 may not be aware that they are communicating with the secure data interface system 68 only, and may instead believe that they are communicating with the monitoring and protection system 12 directly. As configuration data 113 to the monitoring and protection system 12 is applied, the configuration data 113 may be communicated to the secure digital interface system 68 to keep the systems 12 and 68 synchronized. By maintaining synchronization, the system 68 may derive the same outputs as the monitoring and protection system 12 based on the receiving the same inputs. The configuration data 113 may include any number of parameters, variables, programming, firmware, and any other data used to modify operations of the monitoring and protection system 12. In one example, the configuration data 113 may be automatically applied to the digital interface system 68 based on data applied to the monitoring and protection system 12. In another example, the configuration data 113 may be manually applied to the digital interface system 68 during or after the application of changes to the monitoring and protection system 12. By synchronizing the secure data interface system 68 with the monitoring and protection system 12, the M&P emulator 108 may provide the same or substantially the same calculations as those provided by the monitoring and protection system 12.

Figure 4:
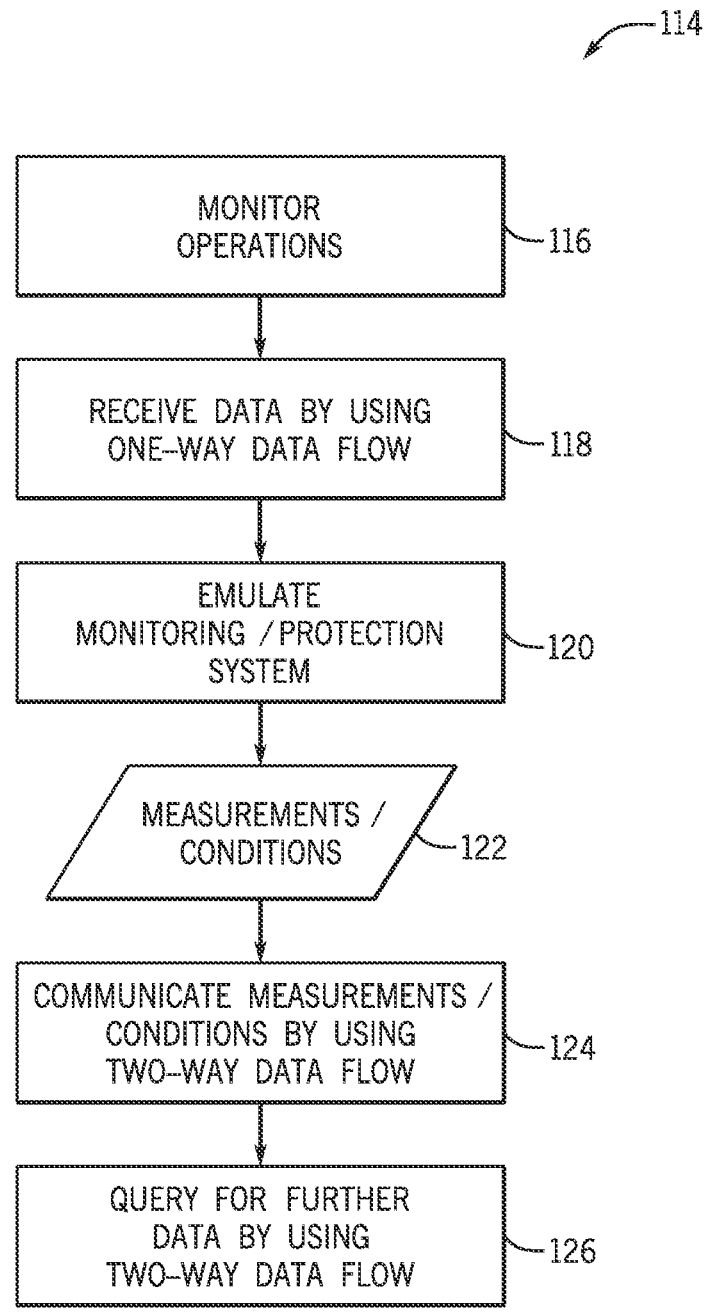
FIG. 4 is a flow chart of an embodiment of a process suitable for receiving one-way data by using the secure data interface system of FIG. 1-3, processing the data, and communicating with external systems.

FIG. 4 is a flow chart of an embodiment of a process 114. The process 114 may be implemented by using computer instructions executable by a processor, such as the processors 13, 71, and stored in a memory such as the memory 14, 72. As depicted, the process 114 may monitor operations (block 116), for example, operations of the system 10. Accordingly, sensor 62 data, including raw sensor 62 data, may be received (block 118) by the secure data interface 68. The secure data interface 68 may use, for example, the one way data interface 100 to receive (block 118) the sensor 62 data. The processing engine 102 may then use the M&P emulator 102 to emulate (block 120) the monitoring and protection system 12. Accordingly, a number of system 10 conditions and measurements 122 may be derived, including but not limited to keyphasor measurement, a vibration measurement, an axial position, a radial position, a casing velocity, a casing acceleration, a temperature, a differential expansion, an overspeed detection, a rotor wheel acceleration, an actuator position, a shaft eccentricity, rolling element bearing activity monitor data, a speed measurement, a clearance measurement, a pressure measurement, or a flow measurement.

The process 114 may then communicate (block 124) the measurements/conditions 122, for example, to the external systems 80, 82, 84, and/or 86 by using the two-way data interface 110. The external systems 80, 82, 84, and/or 86 may query (block 126) for further data (e.g., measurements/conditions 122). Indeed, as far as the external systems 80, 82, 84, and/or 86 may be concerned, the secure data interface 68 may function like the monitoring and protection system 12, and in some embodiments, the systems 80, 82, 84, and/or 86 may not be aware that the communications are not occurring with the monitoring and protection system 12 and are occurring only with the secure data interface 68. By isolating the monitoring and protection system 12 and the monitored system 10 from external transmissions, the techniques described herein may provide for enhanced security and reliability of operations. It is to be noted that configuration data 113 may include hardware and/or software configuration information. Additionally, the configuration data 113 may be used to synchronize configurations with the systems 80, 82, 84, and 86. For example, the HMI 80, the DCS 82, the DSS 84, and other systems 86 may synchronize communication protocol properties (e.g., subnets, packet types, address resolution), alarm and/or alert configuration, and other configuration information (e.g., client/server setup information, redundant server information, security authentication server information). In short, any hardware and/or configuration that would impact operations between the system 12 and the systems 80, 82, 84, and 86 may also be synchronized with the system 68.

Figure 5:
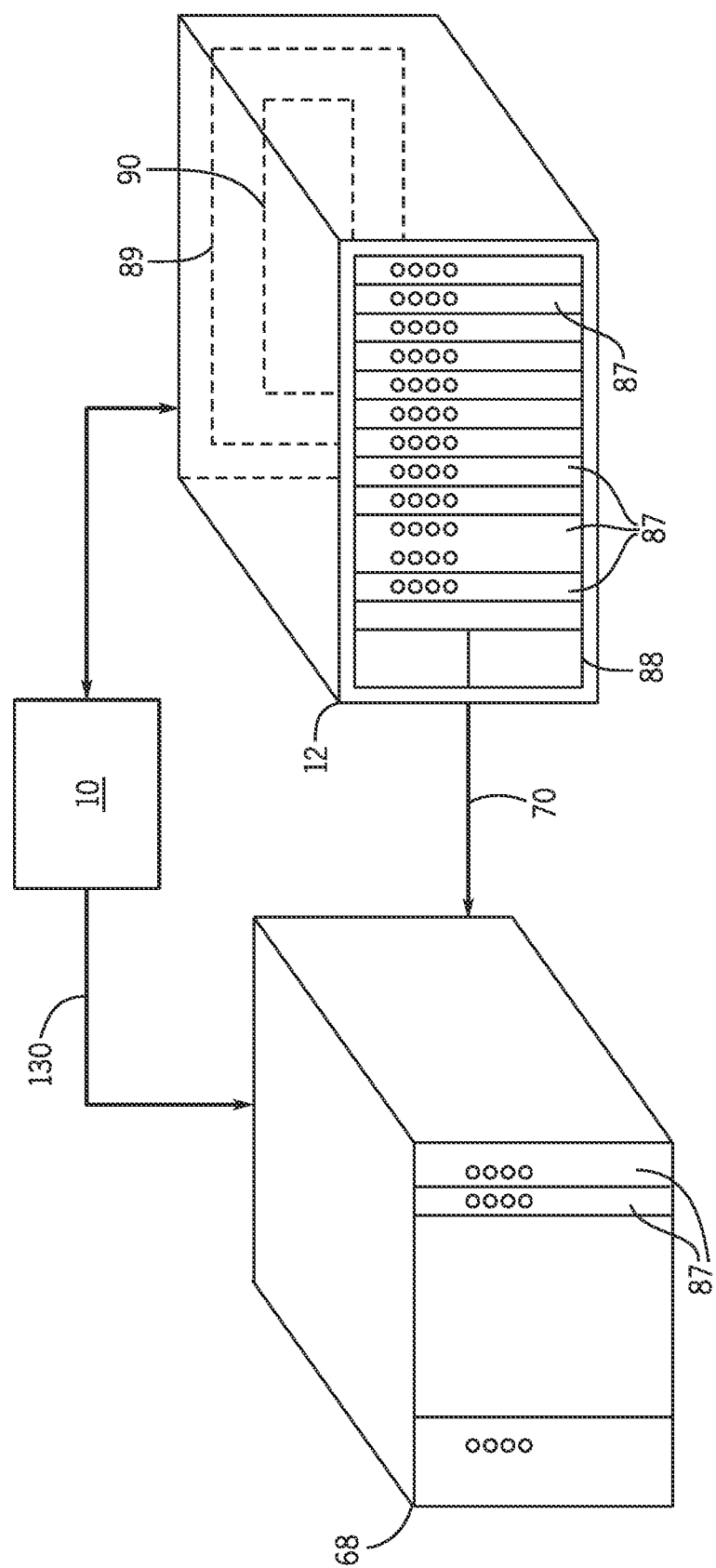
FIG. 5 is a perspective view of an embodiment of the monitoring and protection system of FIG. 1 including another embodiment of the secure data interface system.

Turning now to FIG. 5, the figure is a perspective view of an embodiment of the monitoring and protection system 12 communicatively coupled to the secure data interface 68 via the one-way data flow 70. Because the figure shows like elements to those elements depicted in FIG. 2, the like elements are shown using like numbers. Also depicted in FIG. 5 is a one-way data flow 130 suitable for receiving data from the monitored system 10, such as sensor data. In the depicted embodiment, the secure data interface system 68 is a standalone system. Indeed, in addition to or alternative to a rack-mountable card form factor, the secure data interface system 68 may also be provided as a standalone system. In the standalone form factor, the secure data interface 68 may be rack mountable, and, in embodiment, may be mounted in the same rack that is hosting the monitoring and protection system 12. It is to be noted that, in one embodiment, the data flow 130 may not be used and only the data flow 70 may be used.

Further, in some embodiments, the secure data interface 68 may provide for the insertion of monitoring and protection cards, such as the depicted cards 87. The cards 87 may extend the functionality of the secure data interface 68 by providing for the computation of the keyphasor measurements (e.g., phase relationship between vibration components and timing marks on the shaft 32 and/or 54), relative vibration (e.g., using proximity probes), axial positions, radial positions, casing velocity, casing acceleration, temperatures, differential expansion/case expansion, overspeed detection, rotor wheel 48, 50, 52 acceleration, actuator positions (e.g., valve positions, linear actuator positions), shaft 32 and/or 54 eccentricity, rolling element bearing activity monitor (REBAM®) data, vibration measurements (e.g., axial vibration, radial vibration), speed measurements, clearance measurements (e.g., distance between a rotating component and a stationary component), pressure measurements, flow measurements, or a combination thereof. Accordingly, operating conditions may be derived, including normal operations, abnormal operations, and so on. In another embodiment, the cards 87 may not be provided and the secure data interface 68 may calculate the aforementioned operating conditions. In yet another embodiment, the operating conditions may be derived by a combination of the secure data interface 68 and the cards 87. By providing for the secure data interface 68 as a standalone system, the secure data interface 68 may be installed with minimal disturbance to the monitoring and protection system 12. Changes to the monitoring and protection system 12, such as configuration changes, may then be synchronized as described in more detail below with respect to FIG. 6.

Figure 6:
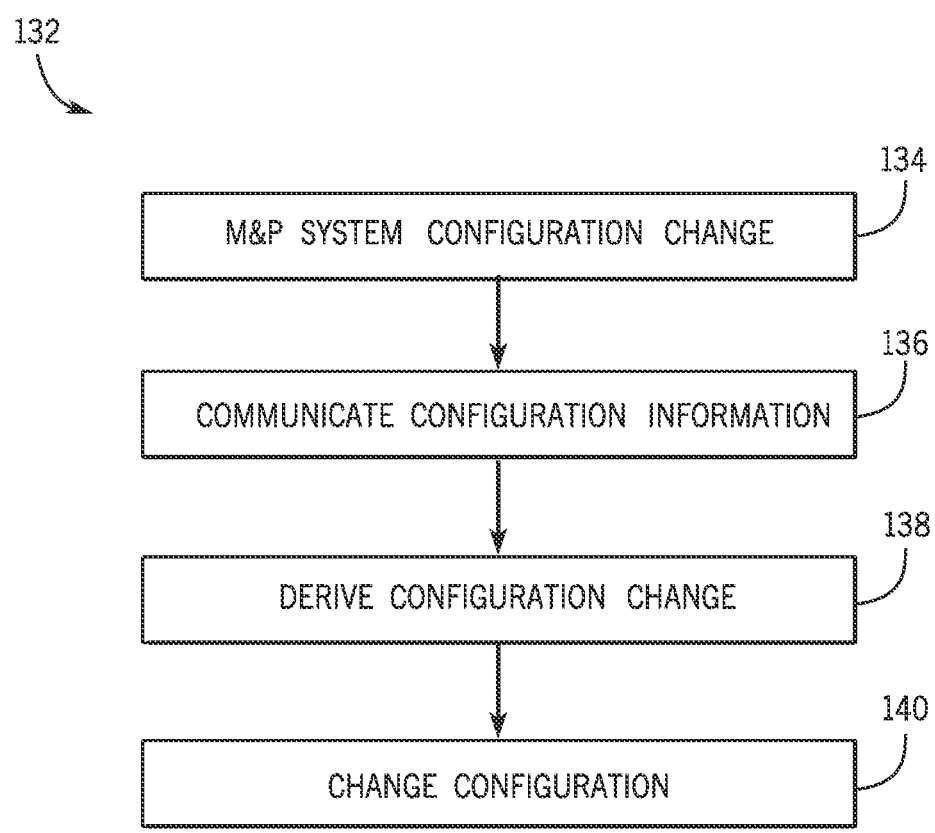
FIG. 6 is a flow chart of an embodiment of process suitable for synchronizing the monitoring and protection system of FIG. 1 with the secure data interface system.

FIG. 6 is a flow chart of an embodiment of a process 132 suitable for synchronization between the monitoring and protection system 12 and the secure data interface 68, such as synchronization of configuration changes. The process 132 may be implemented as computer instructions executable by the processors 13, 71 and stored in the memories 14, 72. In the depicted embodiment, the monitoring and protection system 12 may undergo a configuration change (block 134). For example, new parameters (e.g., operation parameters, calibration parameters, sensor parameters) and/or programming changes, including new firmware, may be applied to the monitoring and protection system 12. The monitoring and protection system 12 may then communicate configuration information to the secure data interface 68. In example, the monitoring and protection system 12 may transmit a configuration version ID to the monitoring and protection system 12. A transmittal (block 136) of the configuration version ID may be provided by using the one-way data flow 70. In the depicted embodiment, the one-way data flow may be provided by using a dedicated cable, a common bus (e.g., rack bus), a wireless conduit (e.g., WIFI), a wired network, and so on.

Several techniques may be used to transmit (block 136) the configuration version ID, for example, by using unidirectional techniques that may obfuscate the transmittal, thus providing for an enhanced layer of protection. Such techniques may include encoding the configuration version ID as a voltage level, a frequency, a pulse stream, or other signal that will not subject the transmitting device to possible network attacks either directly or through the receiving device. Accordingly, network attacks may be minimized or eliminated.

The secure data interface 68 may then receive the configuration version ID and derive (block 136) that the configuration has changed. For example, the received configuration version ID may be compared to an existing configuration version ID to derive the change (block 138). The secure data interface 68 may then alert that a new configuration change has occurred so that its configuration may be changed (block 140) to synchronize configurations between the secure data interface 68 and the monitoring and protection system 12. In one embodiment, the secure data interface 68 may provide for alerts (e.g., blinking lights, email, text messaging, sound alerts) so that a human may respond and manually reconfigure the secure data interface 68 (block 140). In another embodiment, an automated process (block 140) may load the configuration changes from, for example, a proxy server. Accordingly, the secure data interface 68 and the monitoring and protection system 12 may maintain the same or substantially the same configuration, thus providing for the same or substantially the same operating conditions of the monitored system 10. It is to be noted that, in one embodiment, the configuration (e.g., software and/or hardware configuration) may be synchronized with any one or more of the systems 80, 82, 84, and 86, and the process may 132 may be used accordingly, for example, with block 134 representative of the configuration change, block 136 representative of the communication of the configuration information, for example by systems 80, 82, 84, and/or 86. The configuration change may likewise be derived at block 138 and applied at block 140.

Technical effects of the invention include providing for a secure data interface system suitable for receiving data from a monitoring and protection system, emulating the monitoring and protection system to derive certain measurements and equipment conditions, and to communicate the measurements and equipment conditions to external systems. A one way data flow may be provided by using a one way communications interface, suitable for transmitting data from the monitoring and protection system to the secure data interface, including raw sensor data. A two way data flow may additionally be provided by using a two way communications interface, suitable for communication between the secure data interface and external systems. Techniques, including synchronization between the secure data interface and the monitoring and protection system useful in maintaining parameter changes, variable changes, programming changes, firmware changes, and so on, applied to the monitoring and protection system. By providing for isolative communication such as one-way data flows, the techniques described herein may enable a more secure, reliable, and safe operational environment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
   a secure data interface system comprising:
      a one-way communications interface circuitry configured to communicatively couple to a monitoring and protection system to only receive data transmitted by the monitoring and protection system, wherein the monitoring and protection system is configured to monitor operations of a machinery by,
         receiving, via sensors disposed in the machinery, raw sensor data in the form of electrical signals, the raw sensor data representative of at least one operating parameter of the machinery, and
         transforming the received raw sensor data according to a first configuration into at least one condition measurement representative of an operating condition of the machinery;
      a processor configured to emulate the monitoring and protection system by,
         receiving from the one-way communications interface circuitry, the raw sensor data and a first configuration data including the first configuration of the monitoring and protection system, and
         deriving a first condition measurement based on the raw sensor data by executing a monitoring and protection system emulator performing the same transformation upon the received raw sensor data as that performed by the monitoring and protection system according to the first configuration data; and
      a two-way communications interface circuitry configured to:
         communicate the first condition measurement to an external system,
         communicate a query received from the external system to the processor, the query requesting a second condition measurement, different from the first condition measurement;
      wherein the processor is further configured to derive the second condition measurement based on the raw sensor data in response to receipt of the query;
      wherein the two-way communication interface circuitry is further configured to communicate the second condition measurement to the external system; and
      wherein the one-way communications interface circuitry is disposed upstream of the processor configured to emulate the monitoring and protection system.

2. The system of claim 1, wherein the at least one measurement comprises a keyphasor measurement, a vibration measurement, an axial position, a radial position, a casing velocity, a casing acceleration, a temperature, a differential expansion, an overspeed detection, a rotor wheel acceleration, an actuator position, a shaft eccentricity, rolling element bearing activity monitor data, a speed measurement, a clearance measurement, a pressure measurement, or a flow measurement.

3. The system of claim 1, wherein the secure data interface comprises a rack-mountable card configured to couple with a backplane included in a rack of the monitoring and protection system.

4. The system of claim 1, wherein the secure data interface comprises a standalone system communicatively coupled to the monitoring and protection system.

5. The system of claim 1, wherein the processor is configured to:
receive, via the one-way communications interface circuitry, a second configuration data including changes to a configuration of the monitoring and protection system with respect to the first configuration data;
determine that the second configuration data is different from the first configuration data; and
apply the second configuration data after determining the second configuration data is different from the first configuration data to derive the at least one condition measurement based on the raw sensor data by executing the monitoring and protection system emulator to perform the same transformation upon the received raw sensor data as that performed by the monitoring and protection system according to the second configuration data.

6. The system of claim 1, wherein the two-way communications interface is configured to use a plant data highway to communicatively couple to the external system, and wherein the external system comprises a human machine interface (HMI), a distributed control system (DCS), a decision support system (DSS), or a combination thereof.

7. The system of claim 1, wherein the configuration data comprises one or more of a hardware configuration of the monitoring and protection system and a software configuration of the monitoring and protection system.

8. The system of claim 1, wherein the configuration data comprises one or more of an operation parameter, a calibration parameter, and a sensor parameter applied to the monitoring and protection system.

9. A tangible non-transitory machine readable medium storing instructions configured to:
provide a monitoring and protection system configured to,
receive, via sensors disposed in a turbomachinery, raw sensor data in the form of electrical signals, the raw sensor data representative of at least one operating parameter of the turbomachinery, and
transform the received raw sensor data according to a first configuration into at least one condition measurement representative of an operating condition of the machinery;
provide a monitoring and protection system emulator, wherein the monitoring and protection system emulator is configured to,
receive, from a one-way communications interface circuitry, the raw sensor data and a first configuration data including the first configuration of the monitoring and protection system, and
derive a first condition measurement based on the raw sensor data by performing the same transformation upon the received raw sensor data as that performed by the monitoring and protection system according to the first configuration data; and
communicate, via a two-way communication interface circuitry, the first measurement derived by the monitoring and protection system emulator to an external system,
communicate, via the two-way communication interface circuitry, a query received from the external system to the processor, the query requesting a second condition measurement, different from the first condition measurement;
derive, by the monitoring and protection system emulator, the second condition measurement based on the raw sensor data in response to receipt of the query; and
communicate, via the two-way communication interface circuitry, the second condition measurement to the external system;
wherein the one-way communications interface is disposed upstream of the emulated monitoring and protection system.

10. The tangible non-transitory machine readable medium of claim 9, wherein the at least one measurement comprises a keyphasor measurement, a vibration measurement, an axial position, a radial position, a casing velocity, a casing acceleration, a temperature, a differential expansion, an overspeed detection, a rotor wheel acceleration, an actuator position, a shaft eccentricity, rolling element bearing activity monitor data, a speed measurement, a clearance measurement, a pressure measurement, or a flow measurement.

11. The tangible non-transitory machine readable medium of claim 9, wherein the sensor data comprises a thermocouple data, a proximity sensor data, an eddy current sensor data, an ultrasonic sensor data, a velocity sensor data, a vibration sensor data, a pressure sensor data, a clearance sensor data, an accelerometer data, a gyroscope data, a chemical sensor data, an optical sensor data, or a combination thereof.

12. The tangible non-transitory machine readable medium of claim 9, comprising instructions configured to:
cause the monitoring and protection system emulator to receive, from the one-way communication interface circuitry, a second configuration data including changes in a configuration of the monitoring and protection system with respect to the first configuration data,
determine that the second configuration data is different from the first configuration data; and
apply the second configuration data after determining the second configuration data is different from the first configuration data to derive the at least one condition measurement based on the raw sensor data by performing the same transformation upon the received raw sensor data as that performed by the monitoring and protection system according to the second configuration data.

13. The tangible non-transitory machine readable medium of claim 12, wherein the first configuration data includes a first configuration version ID and the second configuration data includes a second configuration version ID, different from the first configuration version ID, and wherein determining that the second configuration data is different from the first configuration data includes comparing the first configuration ID and second configuration version ID.

14. The tangible non-transitory machine readable medium of claim 13, wherein the configuration version ID is encoded as a voltage level, a frequency, a pulse stream, or a combination thereof.

15. The tangible non-transitory machine readable medium of claim 12, wherein the change in configuration comprises a parameter, a variable, a program, a firmware, or a combination thereof.

16. The tangible non-transitory machine readable medium of claim 12, comprising instructions configured to alert a user after receiving the configuration data.

17. A method comprising:
monitoring operations of a machinery by using a monitoring and protection system, wherein the monitoring and protection system is configured to,
  receive, via sensors disposed in the machinery, raw sensor data in the form of electrical signals, the raw sensor data representative of at least one operating parameter of the machinery, and
  transform the received raw sensor data into at least one condition measurement representative of an operating condition of the machinery;
operating using the monitoring and protection system to transmit a first data via a one-way data flow, the first data including the raw sensor data and a first configuration data including a first configuration of the monitoring and protection system;
operating using a secure data interface system to,
  receive the first data via the one-way data flow;
  derive a first condition measurement via a monitoring and protection system emulator based on the raw sensor data by performing the same transformation upon the received raw sensor data as that performed by the monitoring and protection system according to the first configuration data; and
  transmit the derived first condition measurement to an external system via a two-way data flow;
  receive, via the two-way data flow, a query from the external system, the query requesting a second condition measurement, different from the first condition measurement;
  deriver the second condition measurement based on the raw sensor data in response to receipt of the query; and
  transmit the derived second condition measurement to the external system via the two-way data flow;
wherein the one-way data flow is disposed upstream of the monitoring and protection system emulator.

18. The method of claim 17, comprising:
receiving, via the one-way data flow, a second configuration data including changes to a configuration of the monitoring and protection system with respect to the first configuration data;
determining that the second configuration data is different from the first configuration data; and
applying the second configuration data after determining the second configuration data is different from the first configuration data to derive the at least one condition measurement based on the raw sensor data by performing the same transformation upon the received raw sensor data as that performed by the monitoring and protection system according to the second configuration data.

19. The method of 18, comprising querying the secure data interface system for a second data by using the two-way data flow.

* * * * *